(12) United States Patent
Tamigniaux et al.

(10) Patent No.: US 11,519,763 B2
(45) Date of Patent: Dec. 6, 2022

(54) ASSEMBLY INCLUDING A MAIN SUPPORT, AN INTERMEDIATE SUPPORT DISPOSED ON THE MAIN SUPPORT, AND A SCALE DISPOSED ON THE INTERMEDIATE SUPPORT

(71) Applicant: ETEL S.A., Motiers (CH)

(72) Inventors: Philippe Tamigniaux, Morteau (FR); Pierre-Andre Zanoni, Yverdon-les-Bains (CH); Dennis Stone, Neuchatel (CH); Gorka Galdos, Couvet (CH)

(73) Assignee: ETEL S.A., Motiers (CH)

( * ) Notice: Subject to any disclaimer, the term of this patent is extended or adjusted under 35 U.S.C. 154(b) by 386 days.

(21) Appl. No.: 16/802,584

(22) Filed: Feb. 27, 2020

(65) Prior Publication Data

US 2020/0284625 A1  Sep. 10, 2020

(30) Foreign Application Priority Data

Mar. 6, 2019 (EP) .................................... 19160940

(51) Int. Cl.
 *G01D 11/30* (2006.01)
 *G01B 21/02* (2006.01)
 *G01B 11/02* (2006.01)

(52) U.S. Cl.
 CPC .............. *G01D 11/30* (2013.01); *G01B 11/02* (2013.01); *G01B 21/02* (2013.01)

(58) Field of Classification Search
 None
 See application file for complete search history.

(56) References Cited

U.S. PATENT DOCUMENTS 4,160,328 A * 7/1979 Ernst .................... G01B 5/02
                                                  33/705
4,912,856 A * 4/1990 Ernst ................ G01D 5/34707
                                                  33/702

(Continued)

FOREIGN PATENT DOCUMENTS

DE       4212970 A1   10/1993
DE      19512892 A1   10/1996

(Continued)

*Primary Examiner* — Lina M Cordero
(74) *Attorney, Agent, or Firm* — Leydig, Voit & Mayer Ltd.

(57) ABSTRACT

An assembly includes a main support having integrated therein first and second fastening devices, an intermediate support and a scale, as well as third and fourth fastening devices. The scale has a measuring graduation disposed in a measuring graduation plane and adapted for position measurement in a longitudinal direction. The first fastening device is designed to hold the intermediate support on the main support at a first position such that it is longitudinally fixed, and the second fastening device is designed to hold the intermediate support at a second position such that it is freely movable in the longitudinal direction. The third fastening device is designed to hold the scale on the intermediate support at the first position such that it is longitudinally fixed, and the fourth fastening device is designed to hold the scale at a third position such that it is freely movable in the longitudinal direction.

16 Claims, 11 Drawing Sheets

(56) References Cited

U.S. PATENT DOCUMENTS

| | | | | |
|---|---|---|---|---|
| 5,279,043 | A | * | 1/1994 | Rieder ............... G01D 5/34753 |
| | | | | 33/DIG. 19 |
| 5,375,338 | A | | 12/1994 | Nelle |
| 5,555,633 | A | * | 9/1996 | Stott .................... G01B 5/0014 |
| | | | | 33/704 |
| 5,711,084 | A | | 1/1998 | Spanner et al. |
| 8,156,658 | B2 | | 4/2012 | Kummetz et al. |
| 8,359,764 | B2 | | 1/2013 | Pucher et al. |
| 9,772,204 | B2 | | 9/2017 | Bauer et al. |
| 2011/0067255 | A1 | * | 3/2011 | Kummetz .......... G01D 5/34707 |
| | | | | 33/707 |
| 2016/0146641 | A1 | * | 5/2016 | Bauer ................. G01B 5/0014 |
| | | | | 33/706 |

FOREIGN PATENT DOCUMENTS

| | | | | | |
|---|---|---|---|---|---|
| DE | 102005027025 | A1 | | 12/2006 | |
| DE | 102009044917 | A1 | | 4/2011 | |
| DE | 102014218483 | A1 | * | 3/2016 | ......... B23Q 11/0003 |
| EP | 3026389 | A1 | | 6/2016 | |
| EP | 3078940 | A1 | | 10/2016 | |

* cited by examiner

ASSEMBLY INCLUDING A MAIN SUPPORT, AN INTERMEDIATE SUPPORT DISPOSED ON THE MAIN SUPPORT, AND A SCALE DISPOSED ON THE INTERMEDIATE SUPPORT

CROSS-REFERENCE TO PRIOR APPLICATION

Priority is claimed to European Patent Application No. EP 19160940.3, filed on Mar. 6, 2019, the entire disclosure of which is hereby incorporated by reference herein.

FIELD

The present invention relates to an assembly including a main support, an intermediate support disposed on the main support, and a scale disposed on the intermediate support.

BACKGROUND

Such length-measuring devices are used, in particular, in machine tools for measuring the position of a tool relative to a workpiece to be machined, in coordinate measuring machines for determining the position and dimensions of test objects, as well as in the semiconductor industry. In such devices, the scale is directly attached to a support, for example, the drive unit (e.g., a linear motor), or the scale is attached to a component driven by the drive unit. A scanning unit of the position-measuring device is stationarily disposed opposite the moving scale on a second object whose relative position with respect to the support is to be measured.

The requirements placed on position-measuring devices are getting higher and higher. Demands are constantly being made for higher resolution and for higher accuracy and reproducibility of the position measurement. To create a fixed point of the scale with respect to the support, it is known to fix the scale to the support at one point such that it is stationary in the measurement direction.

In most cases, the scale and the support are composed of materials having different thermal expansion properties. The stationary fixation has to be implemented in such a way that no constraining forces will be exerted by the support on the scale in response to temperature changes.

A position-measuring device of this type is described in DE 195 12 892 A1. In this position-measuring device, a scale is formed by a support member and a material measure. The material measure is connected to the support member via two spaced-apart support areas. One of the support areas forms a fixation point for the attachment of the material measure to the support member. The second support area forms a flexible attachment point, which allows for thermally induced displacement of the material measure relative to the support member in the longitudinal direction, starting at the fixating support area.

SUMMARY

In an embodiment, the present invention provides an assembly which includes a main support having integrated therein a first and a second fastening device, an intermediate support disposed on the main support and a scale disposed on the intermediate support and extending in a longitudinal direction, as well as a third and a fourth fastening device. The first and the second fastening device are spaced apart in a longitudinal direction. Also, the third and the fourth fastening device are spaced apart in the longitudinal direction. The scale has a measuring graduation disposed in a measuring graduation plane and adapted for position measurement at least in the longitudinal direction. The first fastening device is designed to hold the intermediate support on the main support at a first position in such way that the intermediate support is fixed in the longitudinal direction, and the second fastening device is designed to hold the intermediate support at a second position different from the first position in such a way that the intermediate support is freely movable relative to the main support in the longitudinal direction. The third fastening device is designed to hold the scale on the intermediate support at the first position in such a way that the scale is fixed in the longitudinal direction, and the fourth fastening device is designed to hold the scale at a third position different from the first position and the second position in such a way that the scale is freely movable relative to the intermediate support in the longitudinal direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
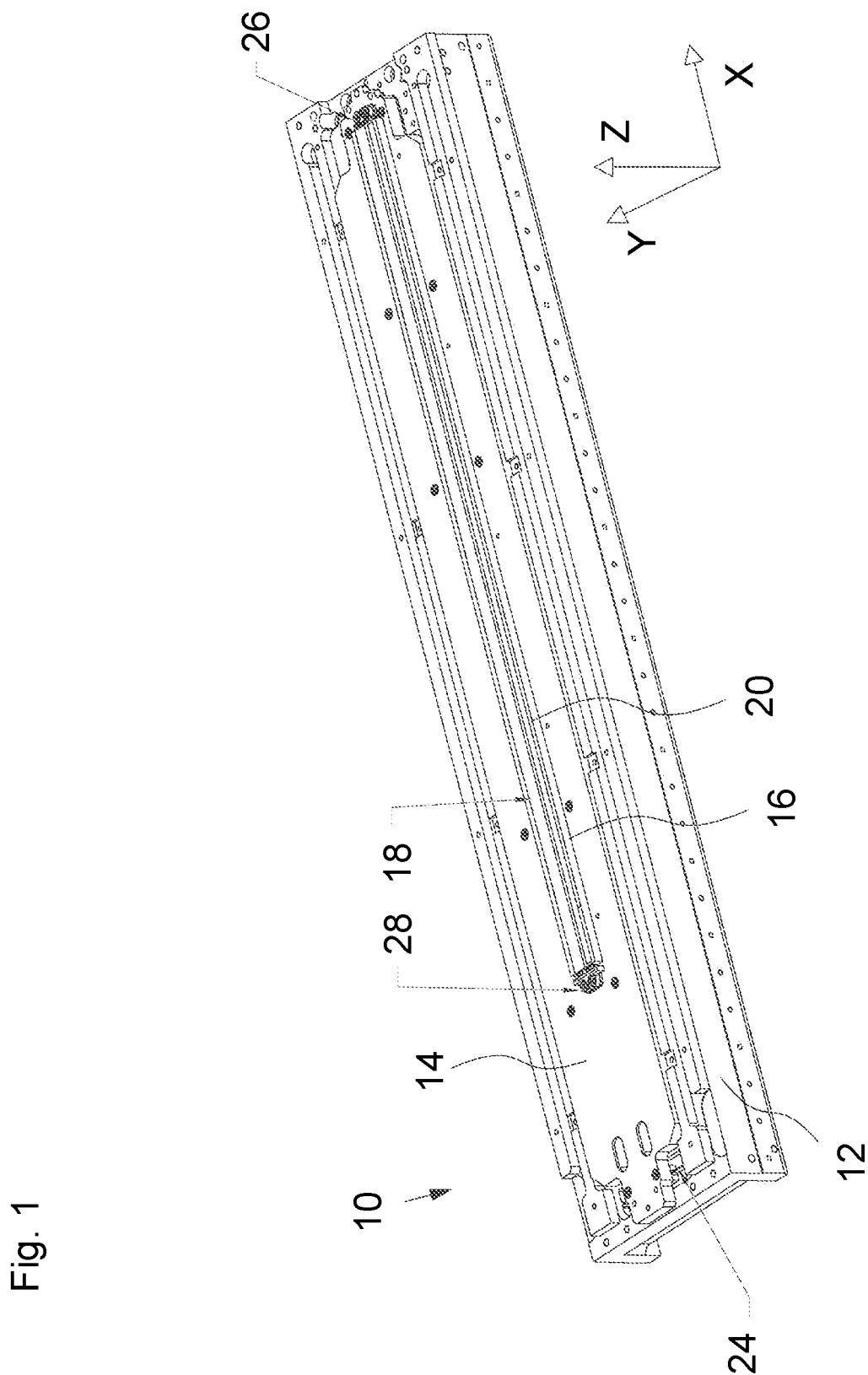
FIG. 1 is a perspective view of an assembly that is designed in accordance with an embodiment of the present invention and includes a main support, an intermediate support disposed on the main support, and a scale disposed on the intermediate support.

In an embodiment, the present invention provides an assembly which includes a main support, an intermediate support disposed on the main support, and a scale disposed on the intermediate support, and which is compact in design and permits accurate position measurement.

The assembly designed in accordance with an embodiment of the present invention includes a main support, an intermediate support disposed on the main support, and a scale disposed on the intermediate support. The scale extends in a longitudinal direction. The scale has a measuring graduation disposed in a measuring graduation plane and adapted for position measurement at least in the longitudinal direction. The main support has a first fastening device and a second fastening device. The first fastening device and the second fastening device are integrated in the main support. The first fastening device and the second fastening device are spaced apart in the longitudinal direction. The first fastening device is designed to hold the intermediate support on the main support at a first position in such way that it is fixed in the longitudinal direction. The second fastening device is designed to hold the intermediate support at a second position different from the first position in such a way that it is freely movable relative to the main support in the longitudinal direction. The assembly has a third fastening device and a fourth fastening device. The third fastening device and the fourth fastening device are spaced apart in the longitudinal direction. The third fastening device is designed to hold the scale on the intermediate support at the first position in such a way that it is fixed in the longitudinal direction. The fourth fastening device is designed to hold the scale at a third position different from the first position and the second position in such a way that it is freely movable relative to the intermediate support in the longitudinal direction.

Preferably, the first position, the second position and the third position are longitudinal positions which differ from each other.

It is advantageous if the first fastening device is designed to hold the intermediate support at the first position in such a way that it is freely rotatable relative to the main support about an axis of rotation associated with the first position and extending perpendicularly to the measuring graduation plane, and if the second fastening device is designed to hold the intermediate support at the second position in such a way that it is freely rotatable relative to the main support about an axis of rotation associated with the second position and extending perpendicularly to the measuring graduation plane.

It is further advantageous if the main support has a plurality of additional fastening devices, if the additional fastening devices are integrated in the main support, and if the additional fastening devices are disposed and distributed in the longitudinal direction between the first fastening device and the second fastening device and designed to hold the intermediate support at a plurality of additional positions different from the first position and the second position in such a way that it is freely movable relative to the main support in the longitudinal direction and in a transverse direction perpendicular to the longitudinal direction.

Preferably, the additional fastening devices are designed to hold the intermediate support at the additional positions in such a way that it is freely rotatable relative to the main support about axes of rotation associated with the additional positions and extending perpendicularly to the measuring graduation plane.

An embodiment of the present invention makes it possible, firstly, to (locally) fix the scale in position relative to the main support and, secondly, to provide for double decoupling of the scale from the main support. For this purpose, provision is made for a decoupling between the main support and the intermediate support and a further decoupling between the intermediate support and the scale. The decoupling is in each case provided in at least one translational degree of freedom; i.e., at least in the longitudinal direction (measurement direction). The double decoupling ensures that no constraining forces will be exerted by the main support on the scale, even in the case of temperature changes. The intermediate support also serves as a thermal insulation element that prevents direct heat transfer from the main support to the scale. Also, in the event of destruction of or damage to the scale, the intermediate support can be easily replaced.

An embodiment of the present invention will now be described with reference to FIGS. 1 through 10. The assembly 10 designed in accordance with an embodiment of the present invention includes a main support 12, an intermediate support 14 disposed on main support 12, and a scale 16 disposed on intermediate support 14. Scale 16 extends in a longitudinal direction X and has a measuring graduation 18 disposed in a measuring graduation plane 20. Measuring graduation 18 is configured as a photoelectrically scannable incremental graduation for high-accuracy position measurement in longitudinal direction X and, in addition, in a second direction Y extending perpendicularly thereto. Scale 16 is preferably composed of a material having a negligibly small thermal expansion coefficient, in particular a thermal expansion coefficient α of less than $1.5 \times 10^{-6} K^{-1}$, more particularly of less than $0.1 \times 10^{-6} K^{-1}$, in a temperature range from 0° to 50° C. Such materials include glass and glass-ceramic materials (e.g., ZERODUR), as well as metals such as Invar, for example.

Main support 12 and intermediate support 14 are preferably made of steel having a thermal expansion coefficient of about $10.5 \times 10^{-6} K^{-1}$.

Main support 12 and intermediate support 14 are each configured as a plate-shaped structure. Scale 16 has a rectangular cross section with two opposite faces 62, 64, each extending transversely to longitudinal direction X (see FIG. 5).

Figure 2:
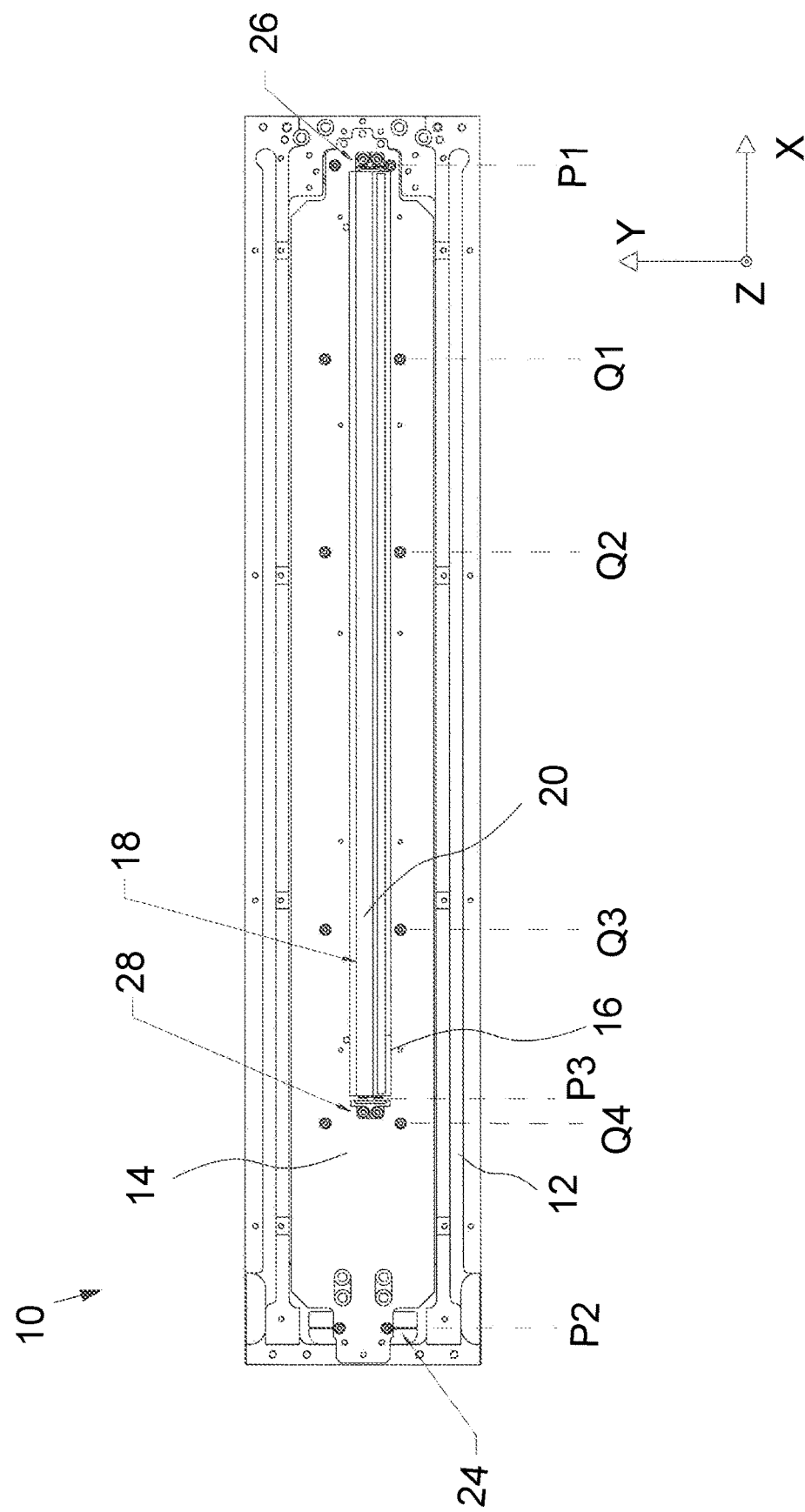
FIG. 2 is a plan view of the assembly of FIG. 1.

The three-part design consisting of main support 12, intermediate support 14 and scale 16 is shown in FIGS. 1 and 2. The individual components; i.e., main support 12, intermediate support 14 and scale 16, are shown in the FIGS. 3 through 5.

Figure 3:
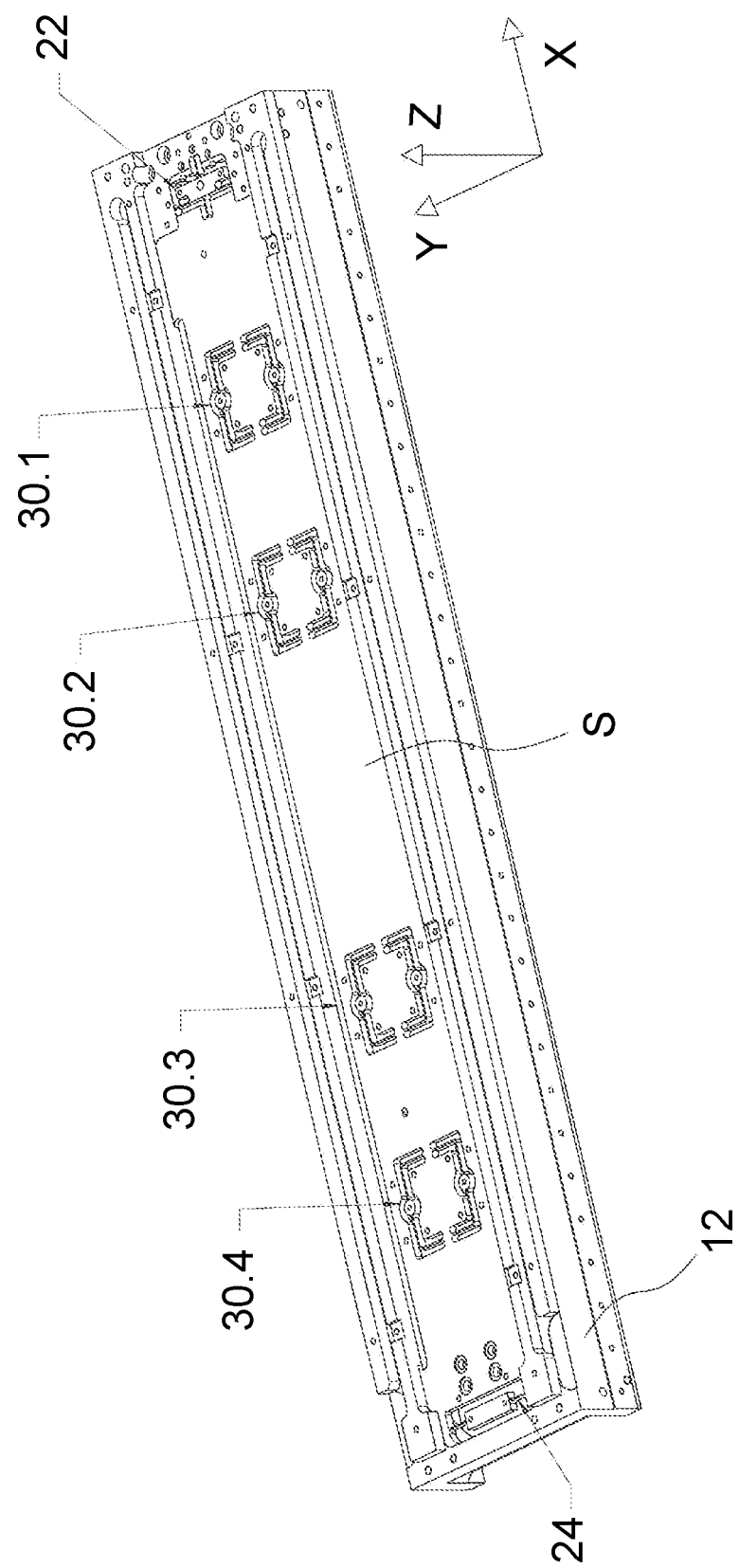
FIG. 3 is a perspective view showing the main support with a first fastening device integrated in the main support and a second fastening device integrated in the main support.
Figure 5:
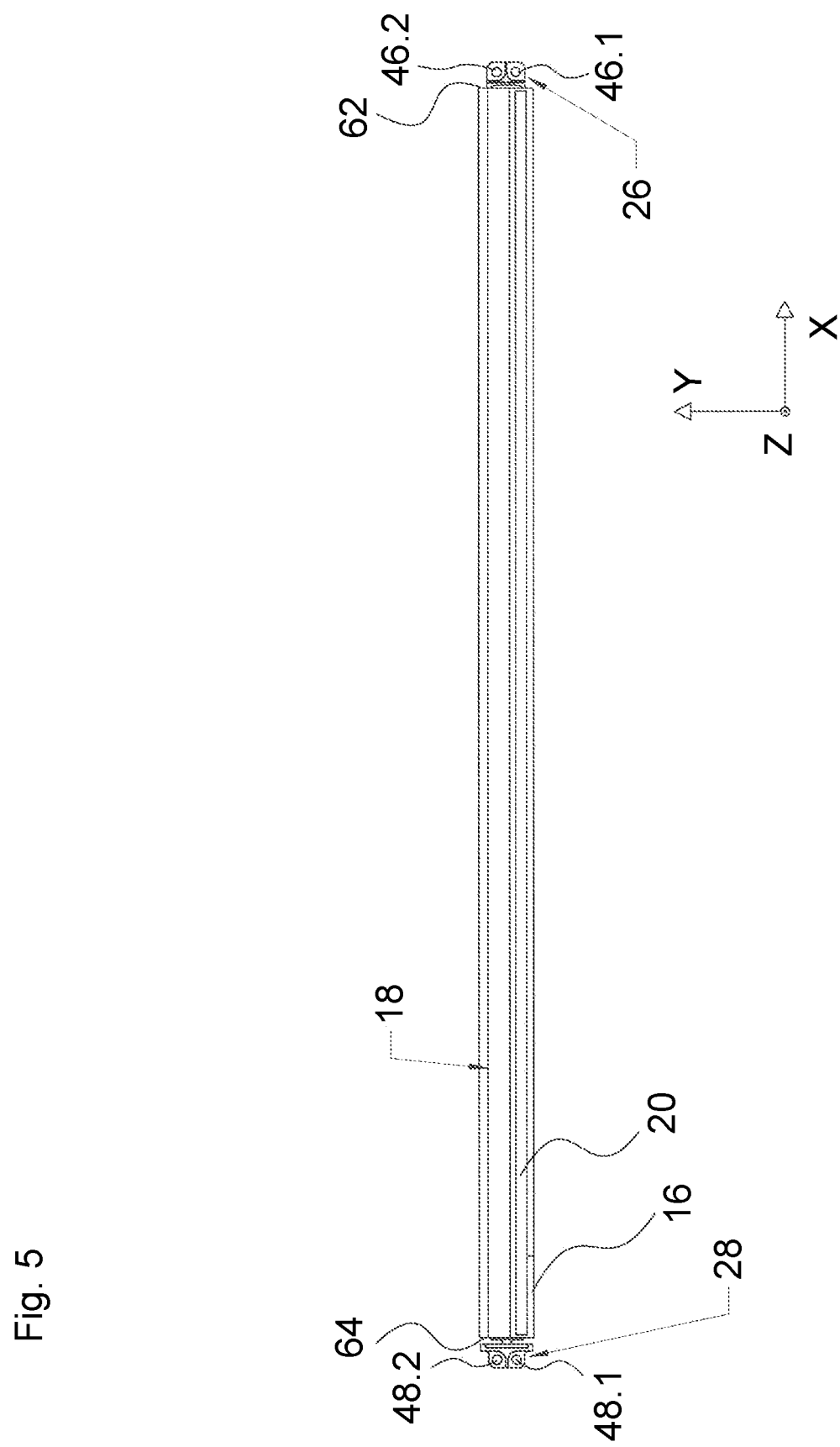
FIG. 5 is a plan view of the scale, which can be contacted by a third fastening device and a fourth fastening device at opposite faces.

As illustrated in FIG. 3, main support 12 has a first fastening device 22 integrated in main support 12 and a second fastening device 24 integrated in main support 12. First fastening device 22 and second fastening device 24 are spaced apart in longitudinal direction X. FIG. 1 further shows that assembly 10 has a third fastening device 26 and a fourth fastening device 28. Third fastening device 26 and fourth fastening device 28 are spaced apart in longitudinal direction X. Referring to FIGS. 1 and 5, third fastening device 26 and fourth fastening device 28 are disposed on intermediate support 14 and configured to contact scale 16 at the opposite faces 62, 64.

First through fourth fastening devices 22 through 28 serve firstly to (locally) fix scale 16 in position relative to main support 12 and secondly to provide for double decoupling of scale 16 from main support 16, in each case at least in one translational degree of freedom; i.e. in longitudinal direction X (measurement direction). For this purpose, first fastening device 22 is designed to hold intermediate support 14 on main support 12 at a first position P1 in such way that it is fixed in longitudinal direction X. Second fastening device 24 is designed to hold intermediate support 14 at a second position P2 different from the first position P1 in such a way that it is freely movable relative to main support 12 in longitudinal direction X. Third fastening device 26 is designed to hold scale 16 on intermediate support 14 at the first position P1 in such a way that it is fixed in longitudinal direction X. Fourth fastening device 28 is designed to hold scale 16 at a third position P3 different from the first position P1 and the second position P2 in such a way that it is freely movable relative to intermediate support 14 in longitudinal direction X. Preferably, the first through third positions P1 through P3 are longitudinal positions which differ from each other; i.e., positions along longitudinal direction X, as illustrated in FIG. 2.

Referring to FIG. 3, in addition to first and second fastening devices 22, 24 (i.e., the fastening devices disposed at opposite ends of main support 12), main support 12 has a plurality of additional fastening devices 30.1 through 30.4, which are integrated in main support 12. As illustrated in FIG. 3, the additional fastening devices 30.1 through 30.4 are disposed and distributed in longitudinal direction X between first fastening device 22 and second fastening device 24. They serve, in particular, to hold intermediate support 14 at a plurality of additional positions Q1 through Q4 different from the first position P1 and the second position P2 in such a way that it is freely movable relative to main support 12 in longitudinal direction X and in a transverse direction Y perpendicular to longitudinal direction X (i.e., parallel to measuring graduation plane 20). The additional positions Q1 through Q4 are preferably longitudinal positions which differ from each other; i.e., positions located along longitudinal direction X between first and second positions P1, P2. This, in turn, is illustrated in FIG. 2.

Fastening devices 22, 24 and 30.1 through 30.4 may advantageously be produced using a wire discharge machining process. Other generally known machining processes may also be used for this purpose. As can be seen in FIG. 3, fastening devices 22, 24 and 30.1 through 30.4 are formed by openings in surface S of main support 12.

Figure 4:
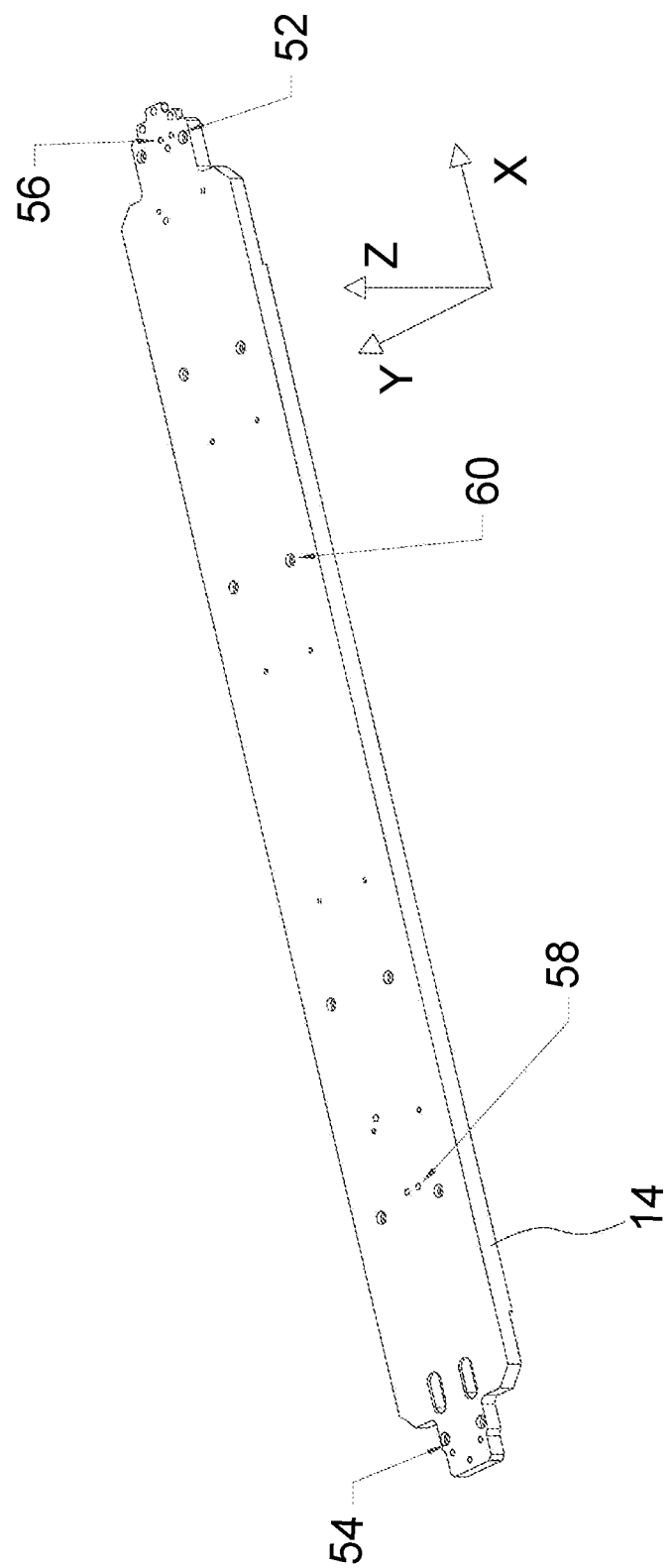
FIG. 4 is a perspective view of the intermediate support.

The intermediate support 14 shown in FIG. 4 has several pairs of openings 52 through 60 for receiving mounting screws. This makes it possible, firstly, to attach intermediate support 14 to main support 12 and, secondly, to attach scale 16 to intermediate support 14 via third and fourth fastening devices 26, 28. For this purpose, as illustrated in FIG. 5, third and fourth fastening devices 26, 28 have pairs of openings 46.1, 46.2; 48.1, 48.2 associated with the respective pairs of openings 56, 58 and adapted to receive mounting screws.

In FIGS. 6 through 10, the first through fourth fastening devices 22 through 28 and one of the additional fastening devices 30.1 through 30.4 (hereinafter "additional fastening device 30") are shown in enlarged views. The views of FIGS. 6 through 10 serve to illustrate the principle of operation of the fastening devices 22 through 28, 30, which are each configured as a flexure bearing.

Figure 6:
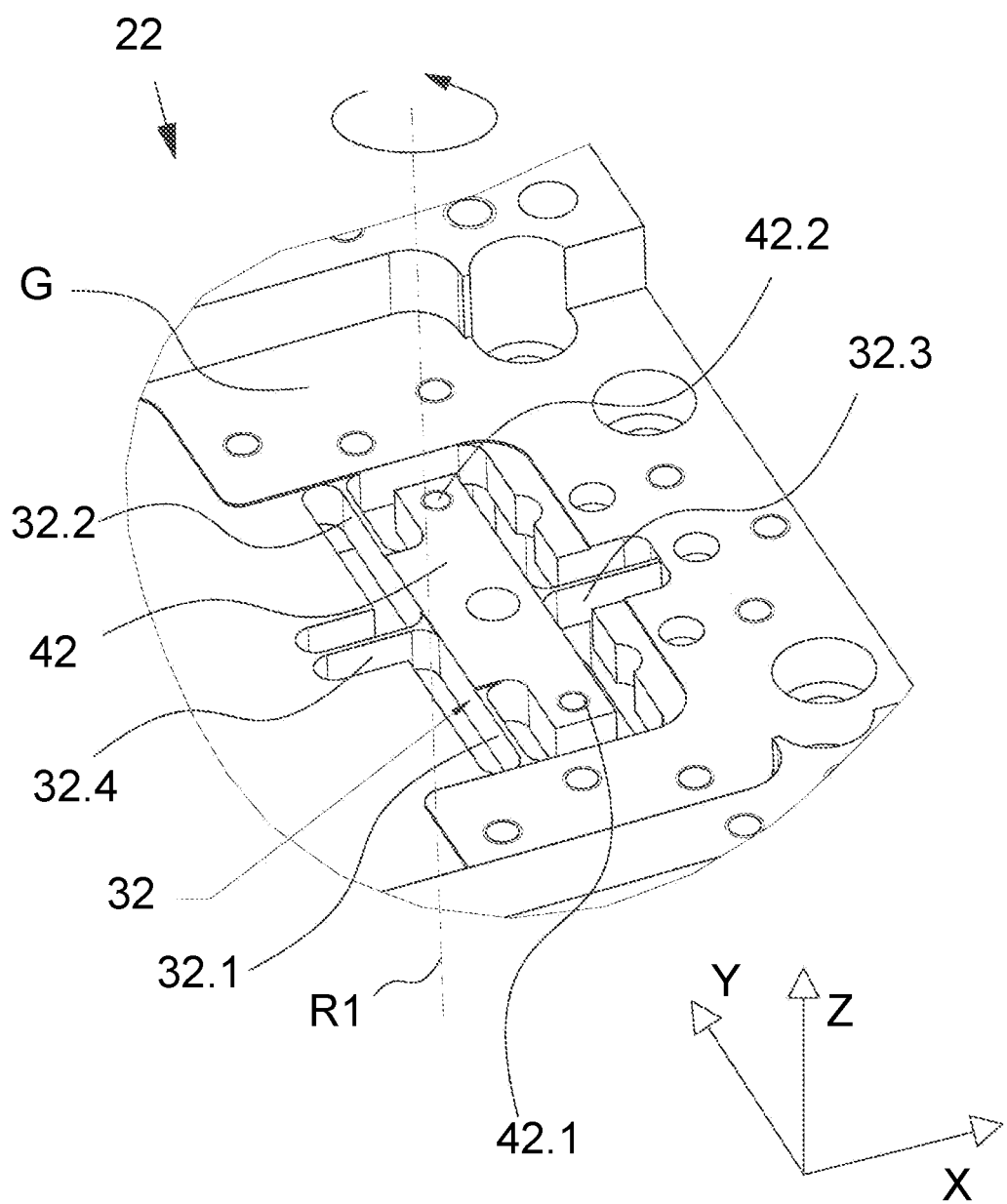
FIG. 6 is a perspective view of the first fastening device.

FIG. 6 is a perspective view of first fastening device 22. First fastening device 22 includes four flat springs 32.1 through 32.4. Flat springs 32.1 through 32.4 form a flexure bearing 32. As illustrated in FIG. 6, flat springs 32.1 through 32.4 each extend from main body G of main support 12 to an attachment portion 42 of first fastening device 22. The two flat springs 32.1, 32.2 extend in transverse direction Y, while the two flat springs 32.3, 32.4 extend in longitudinal direction X. Furthermore, each of flat springs 32.1 through 32.4 extends in a vertical direction Z perpendicular to measuring graduation plane 20.

Attachment portion 42 of first fastening device 22 includes a pair of openings 42.1, 42.2 for receiving mounting screws associated with openings 52 of intermediate support 14. In this way, intermediate support 14 can be attached to first fastening device 22.

Referring to FIGS. 2 and 6, first fastening device 22 is designed to hold intermediate support 14 at the first position P1 in such a way that it is freely rotatable relative to main support 12 about an axis of rotation R1 associated with the first position P1 and extending perpendicularly to measuring graduation plane 20. Furthermore, first fastening device 22 is designed to hold intermediate support 14 on main support 12 at the first position P1 in such way that it is fixed in transverse direction Y and in vertical direction Z.

Figure 7:
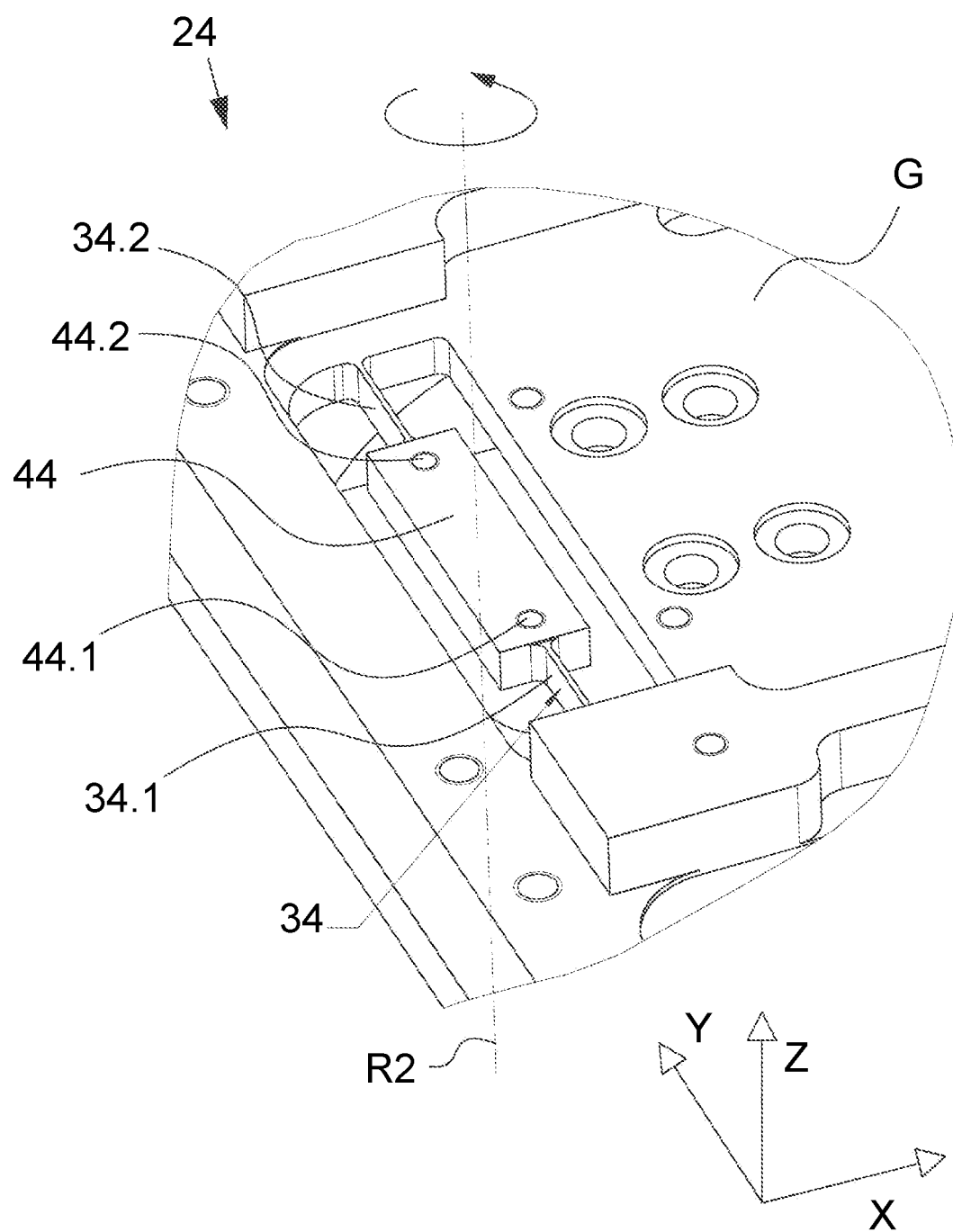
FIG. 7 is a perspective view of the second fastening device.

FIG. 7 shows a perspective view of second fastening device 24. Second fastening device 24 includes two flat springs 34.1, 34.2. Flat springs 34.1, 34.2 form a flexure bearing 34. As illustrated in FIG. 7, flat springs 34.1, 34.2 each extend from main body G of main support 12 to an attachment portion 44 of second fastening device 24. The two flat springs 34.1, 34.2 each extend in transverse direction Y. Furthermore, each of flat springs 34.1, 34.2 extends in vertical direction Z.

Attachment portion 44 of second fastening device 24 includes a pair of openings 44.1, 44.2 for receiving mounting screws associated with openings 54 of intermediate support 14. In this way, intermediate support 14 can be attached to second fastening device 24.

Referring to FIGS. 2 and 7, second fastening device 24 is designed to hold intermediate support 14 at the second position P2 in such a way that it is freely rotatable relative to main support 12 about an axis of rotation R2 associated with the second position P2 and extending perpendicularly to measuring graduation plane 20. Furthermore, second fastening device 24 is designed to hold intermediate support 14 on main support 12 at the second position P2 in such way that it is fixed in transverse direction Y and in vertical direction Z.

Figure 8:
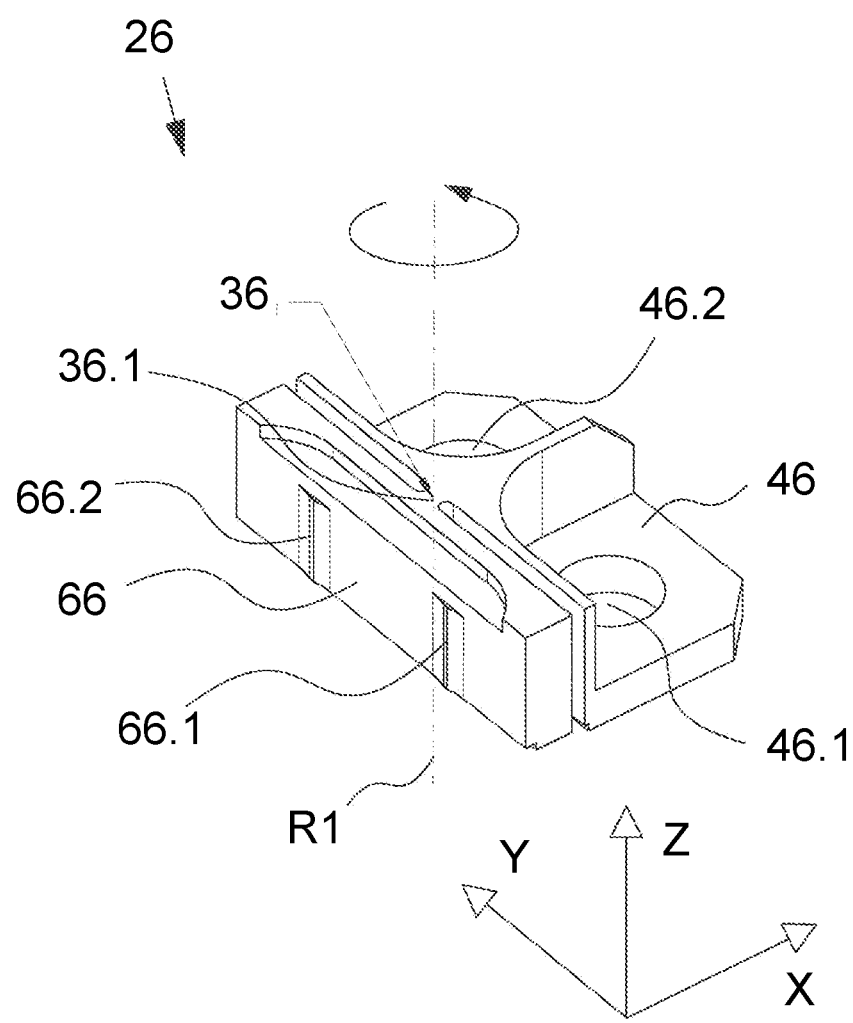
FIG. 8 is a perspective view of the third fastening device.

FIG. 8 shows a perspective view of third fastening device 26. Third fastening device 26 includes a web-like portion 36.1 extending in vertical direction Z. Web-like portion 36.1 forms a flexure bearing 36. Third fastening device 26 includes a first attachment portion 46 for attachment to intermediate support 14 and a second attachment portion 66 for laterally contacting scale 16. First attachment portion 46 includes openings 46.1, 46.2. Openings 46.1, 46.2 are provided for mounting screws in openings 56. Second attachment portion 66 includes two projections 66.1, 66.2 extending in vertical direction Z. Projections 66.1, 66.2 serve to provide reliable and precise contact with face 62 of scale 16. Projections 66.1, 66.2 define an adhesive gap into which an adhesive is introduced on both sides of each of projections 66.1, 66.2 as viewed in transverse direction Y. In this way, scale 16 is attached to third fastening device 26.

Referring to FIGS. 2 and 8, third fastening device 26 is designed to hold scale 16 at the first position P1 in such a way that it is freely rotatable relative to intermediate support 14 about the axis of rotation R1 associated with the first position P1. Furthermore, third fastening device 26 is designed to hold scale 16 on intermediate support 14 at the first position P1 in such way that it is fixed in transverse direction Y and in vertical direction Z.

Figure 9:
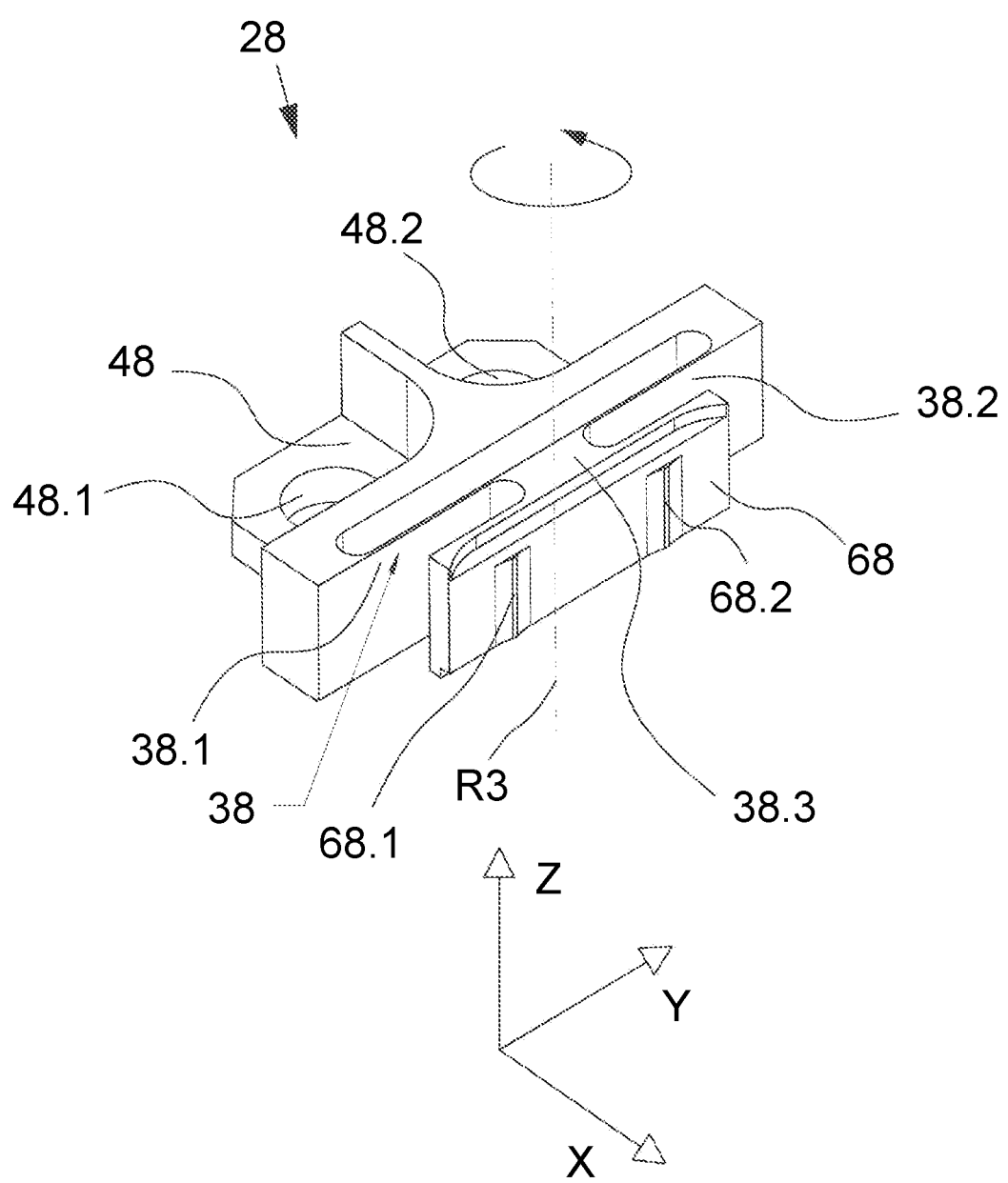
FIG. 9 is a perspective view of the fourth fastening device.

FIG. 9 shows a perspective view of fourth fastening device 28. Fourth fastening device 28 includes two struts 38.1, 38.2 and a reduced portion 38.3. Struts 38.1, 38.2 and reduced portion 38.3 together form a flexure bearing 38. Fourth fastening device 28 includes a first attachment portion 48 for attachment to intermediate support 14 and a second attachment portion 68 for laterally contacting scale 16. First attachment portion 48 includes openings 48.1, 48.2. Openings 48.1, 48.2 are provided for mounting screws in openings 58. Second attachment portion 68 includes two projections 68.1, 68.2 extending in vertical direction Z. Projections 68.1, 68.2 serve to provide reliable and precise contact with face 64 of scale 16. Projections 68.1, 68.2 define an adhesive gap into which an adhesive is introduced on both sides of each of projections 68.1, 68.2 as viewed in transverse direction Y. In this way, scale 16 is attached to fourth fastening device 28.

Referring to FIGS. 2 and 9, fourth fastening device 28 is designed to hold scale 16 at the third position P3 in such a way that it is freely rotatable relative to intermediate support 14 about an axis of rotation R3 associated with the third position P3 and extending perpendicularly to measuring graduation plane 20. Furthermore, fourth fastening device 28 is designed to hold scale 16 on intermediate support 14 at the third position P3 in such way that it is fixed in transverse direction Y and in vertical direction Z.

Figure 10:
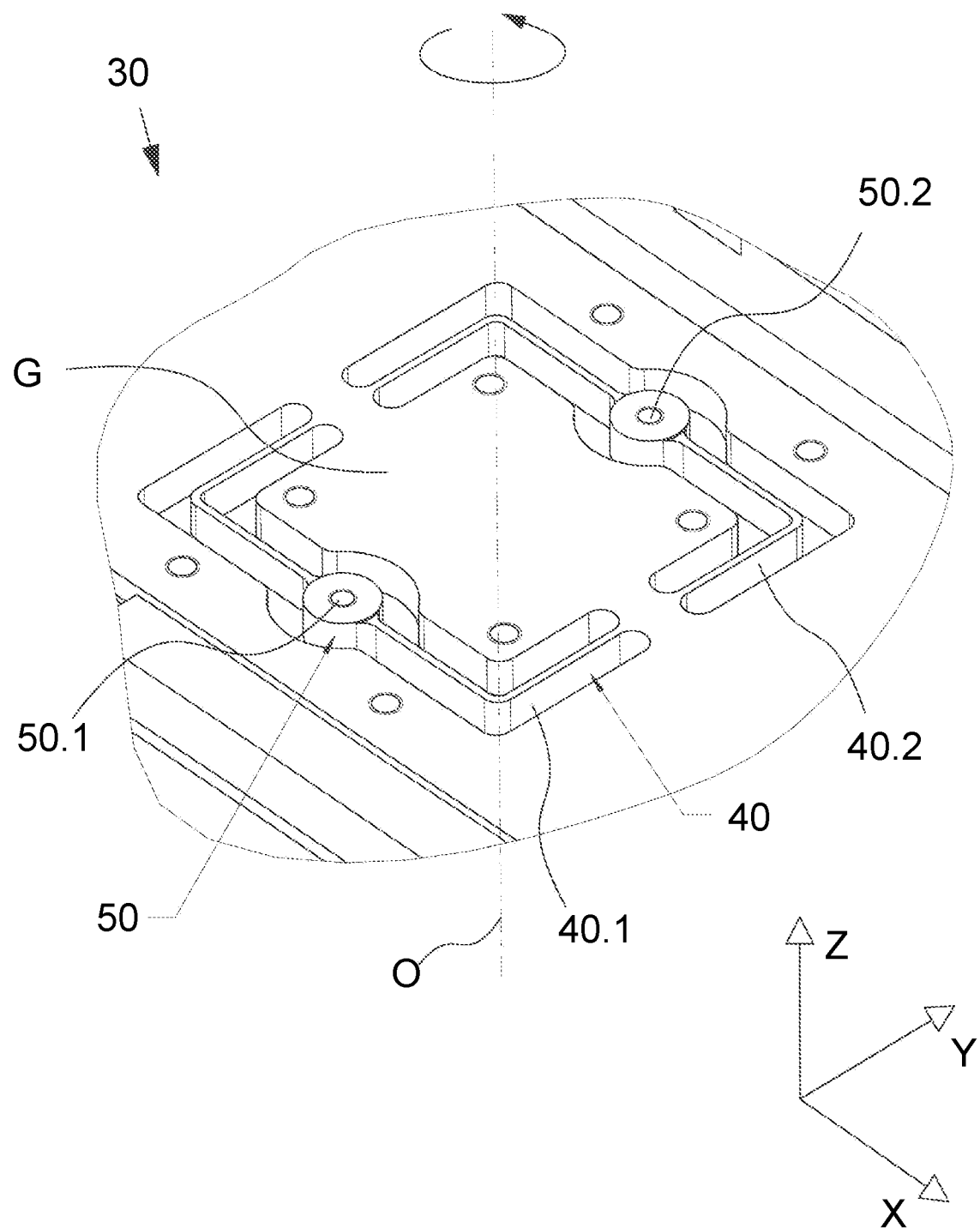
FIG. 10 is a perspective view showing one of a plurality of additional fastening devices integrated in the main support.

FIG. 10 shows a perspective view of additional fastening device 30. Additional fastening device 30 includes two U-shaped flat springs 40.1, 40.2. Flat springs 40.1, 40.2 are arranged symmetrically with respect to an axis of symmetry extending in longitudinal direction X. The two flat springs 40.1, 40.2 together form a flexure bearing 40. As illustrated in FIG. 10, flat springs 40.1, 40.2 each extend from main body G of main support 12 to a corresponding attachment portion 50 of additional fastening device 30. Attachment portions 50 each include an opening 50.1, 50.2 to receive a mounting screw. Openings 50.1, 50.2 of additional fastening device 30 are associated with openings 60 of intermediate support 14. In this way, intermediate support 14 can be attached to additional fastening device 30.

Referring to FIGS. 2, 3 and 10, additional fastening devices 30.1 through 30.4 serve (in addition to the function described above with reference to FIG. 3) to hold intermediate support 14 at the additional positions Q1 through Q4 in such a way that it is freely rotatable relative to main support 12 about axes of rotation associated with the additional positions Q1 through Q4 and extending perpendicularly to measuring graduation plane 20. In FIG. 10, only one of these axes of rotation (axis of rotation O) is exemplarily shown for additional fastening device 30.

As shown in FIG. 10, by way of example, only for additional fastening device 30, flat springs 40.1, 40.2 extend at least in vertical direction Z, thereby preventing movement of intermediate support 14 in vertical direction Z. Referring to FIGS. 2, 3 and 10, additional fastening devices 30.1 through 30.4 are thus designed to hold intermediate support 14 on main support 12 at the additional positions Q1 through Q4 in such way that it is fixed in vertical direction Z.

As explained with reference to FIGS. 6 through 9, the first through fourth fastening devices 22 to 28 serve not only to provide for double decoupling of scale 16 from main support 16 in each case in a translational degree of freedom; i.e., degree of freedom X, but also in a rotational degree of freedom; i.e., degree of freedom RZ. Additional fastening devices 30.1 through 30.4 also serve to provide for decoupling in all in-plane degrees of freedom; i.e., degrees of freedom X, Y and RZ (see FIG. 10).

Figure 11:
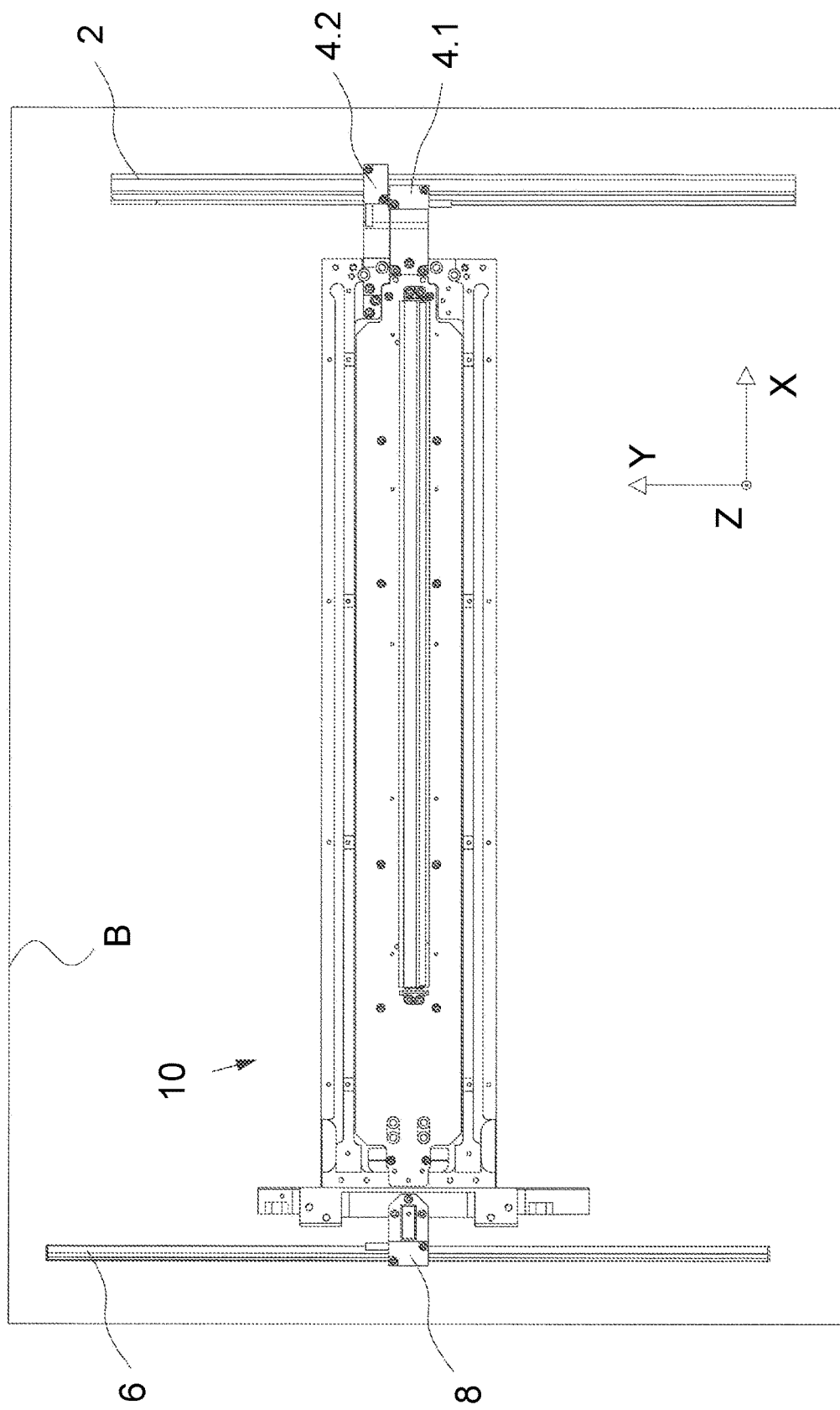
FIG. 11 is a plan view of a measurement system including the assembly according to FIG. 1 and adapted for measuring a position of the fixed point of the scale relative to a stationary reference part.

FIG. 11 shows a plan view of a measurement system including the assembly 10 according to FIG. 1 and adapted for measuring a position of the fixed point of scale 16 (reference point) relative to a stationary reference part B (e.g., machine bed). In the measurement system shown in FIG. 11, two additional scales 2, 6 are provided which are mounted on stationary reference part B. Assembly 10 is movable in transverse direction Y relative to stationary reference part B. The scale 2 includes a measuring graduation for position determination in longitudinal direction X and in transverse direction Y, while scale 6 includes a measuring graduation for position determination only in transverse direction Y. The measuring graduation of scale 2 can be scanned by two scanning heads 4.1, 4.2 coupled to one end of assembly 10. The measuring graduation of scale 6 can be scanned by a scanning head 8 coupled to the other end of assembly 10. By using the three scanning heads 4.1, 4.2, 8, it is possible to determine the position of the reference point (i.e., stationary pivot point or stationary axis of rotation R1 in relation to main support 12) relative to stationary reference part B.

To this end, using the measurement system shown in FIG. 11, the position of assembly 10 relative to stationary reference part B can be determined in the degrees of freedom X, Y and RZ. In this regard, reference is made to application DE 10 2008 010 284 A1, particularly the first embodiment thereof, the contents of which are incorporated in this application by reference.

Scale 16 takes the form of what is referred to as a 1Dplus encoder, for example. In this regard, too, reference is made to the application DE 10 2008 010 284 A1, particularly the explanations of FIGS. 2 through 5.

The present invention is not limited to the photoelectric scanning principle. In particular, measuring graduation 18 may also be adapted to be scannable magnetically or inductively.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembly, comprising:
    a main support having integrated therein a first fastening device and a second fastening device, the first fastening device and the second fastening device being spaced apart in a longitudinal direction;
    a third fastening device and a fourth fastening device, the third fastening device and the fourth fastening device being spaced apart in the longitudinal direction;
    an intermediate support disposed on the main support; and a scale disposed on the intermediate support and extending in the longitudinal direction, the scale having a measuring graduation disposed in a measuring graduation plane and adapted for position measurement at least in the longitudinal direction, wherein the first fastening device is designed to hold the intermediate support on the main support at a first position in such way that the intermediate support is fixed in the longitudinal direction, and the second fastening device is designed to hold the intermediate support at a second position different from the first position in such a way that the intermediate support is freely movable relative to the main support in the longitudinal direction, and wherein the third fastening device is designed to hold the scale on the intermediate support at the first position in such a way that the scale is fixed in the longitudinal direction, and the fourth fastening device is designed to hold the scale at a third position different from the first position and the second position in such a way that the scale is freely movable relative to the intermediate support in the longitudinal direction.

2. The assembly as recited in claim 1, wherein the first fastening device is designed to hold the intermediate support at the first position in such a way that the intermediate support is freely rotatable relative to the main support about an axis of rotation associated with the first position and extending perpendicularly to the measuring graduation plane, and wherein the second fastening device is designed to hold the intermediate support at the second position in such a way that the intermediate support is freely rotatable relative to the main support about an axis of rotation associated with the second position and extending perpendicularly to the measuring graduation plane.

3. The assembly as recited in claim 1, wherein the first fastening device and the second fastening device are designed to hold the intermediate support on the main support at the first position and the second position, respectively, in such a way that the intermediate support is fixed in a transverse direction perpendicular to the longitudinal direction and in a vertical direction perpendicular to the measuring graduation plane.

4. The assembly as recited in claim 1, wherein the third fastening device is designed to hold the scale at the first position in such a way that the scale is freely rotatable relative to the intermediate support about an axis of rotation associated with the first position and extending perpendicularly to the measuring graduation plane, and wherein the fourth fastening device is designed to hold the scale at the third position in such a way that the scale is freely rotatable relative to the intermediate support about an axis of rotation associated with the third position and extending perpendicularly to the measuring graduation plane.

5. The assembly as recited in claim 1, wherein the third fastening device and the fourth fastening device are designed to hold the scale on the intermediate support at the first position and the third position, respectively, in such a way that the scale is fixed in a transverse direction perpendicular to the longitudinal direction and in a vertical direction perpendicular to the measuring graduation plane.

6. The assembly as recited in claim 1, wherein the main support has further integrated therein a plurality of additional fastening devices which are distributed in the longitudinal direction between the first fastening device and the second fastening device and are each designed to hold the intermediate support at a respective one of a plurality of additional positions different from the first position and the second position in such a way that the intermediate support is freely movable relative to the main support in the longitudinal direction and in a transverse direction perpendicular to the longitudinal direction.

7. The assembly as recited in claim 6, wherein the plurality of additional fastening devices are designed to hold the intermediate support at the respective one of the plurality of additional positions in such a way that the intermediate support is freely rotatable relative to the main support about respective axes of rotation associated with the respective one of the plurality of additional positions and extending perpendicularly to the measuring graduation plane.

8. The assembly as recited in claim 6, wherein the plurality of additional fastening devices are designed to hold the intermediate support on the main support at the respective one of the plurality of additional positions in such a way that the intermediate support is fixed in a vertical direction perpendicular to the measuring graduation plane.

9. The assembly as recited in claim 1, wherein the first fastening device and the second fastening device are disposed at opposite ends of the main support.

10. The assembly as recited in claim 1, wherein the scale has a rectangular cross section with two opposite faces, each of the two opposite faces extending transversely to the longitudinal direction, and wherein the third fastening device and the fourth fastening device are disposed on the intermediate support and configured to contact the scale at the two opposite faces.

11. The assembly as recited in claim 1, wherein the first fastening device, the second fastening device, the third fastening device and/or the fourth fastening devices each include a flexure bearing.

12. The assembly as recited in claim 1, wherein the first fastening device and/or the second fastening device each include at least two flat springs, each of the two flat springs extending in a vertical direction perpendicular to the measuring graduation plane.

13. The assembly as recited in claim 1, wherein the main support and the intermediate support have a similar thermal expansion coefficient.

14. The assembly as recited in claim 1, wherein the intermediate support and the scale have different thermal expansion coefficients.

15. The assembly as recited in claim 1, wherein the scale is composed of a material having a thermal expansion coefficient of less than $1.5 \times 10^{-6} K^{-1}$ in a temperature range from 0° C. to 50° C.

16. The assembly as recited in claim 15, wherein the scale is composed of a material having a thermal expansion coefficient of less than $0.1 \times 10^{-6} K^{-1}$ in a temperature range from 0° C. to 50° C.

* * * * *